United States Patent [19]

Ike

[11] Patent Number: 5,153,756
[45] Date of Patent: Oct. 6, 1992

[54] LIQUID CRYSTAL DISPLAY DEVICE WITH AUTOMATIC CONTRAST CONTROL

[75] Inventor: Toshimasa Ike, Tokyo, Japan
[73] Assignee: Seiko Instruments Inc., Japan
[21] Appl. No.: 695,443
[22] Filed: May 3, 1991
[30] Foreign Application Priority Data May 18, 1990 [JP] Japan .................................. 2-129765

[51] Int. Cl.⁵ ................................................ G02F 1/13
[52] U.S. Cl. ........................................ 359/85; 359/86;
340/713; 340/741; 340/742
[58] Field of Search ............................ 350/331 T, 332;
340/713, 729, 741, 742, 767, 793, 784; 359/84,
85, 86

[56] References Cited
U.S. PATENT DOCUMENTS

| | | | |
|---|---|---|---|
| 4,114,366 | 9/1978 | Renner et al. .................. | 340/767 |
| 4,242,679 | 12/1980 | Morozumi et al. ............. | 350/332 X |
| 4,385,294 | 5/1983 | Miles ............................... | 340/784 X |
| 4,514,727 | 4/1985 | Van Antwerp .................. | 340/793 |
| 4,940,931 | 7/1990 | Katayama et al. ............. | 340/793 X |
| 5,027,266 | 6/1991 | Ishii et al. ....................... | 350/332 X |

Primary Examiner—Stanley D. Miller
Assistant Examiner—Huy K. Mai
Attorney, Agent, or Firm—Bruce L. Adams; Van C. Wilks

[57] ABSTRACT

A liquid crystal display apparatus detects and regulates its display contrast. A liquid crystal display unit is provided therein with a pair of liquid crystal cells for use in detection of the display contrast. Incident light is detected through the cells, and the detected results are fed back to control a drive voltage applied to the liquid crystal display unit so as to automatically regulate the display contrast at optimum level.

1 Claim, 2 Drawing Sheets

FIG. 1
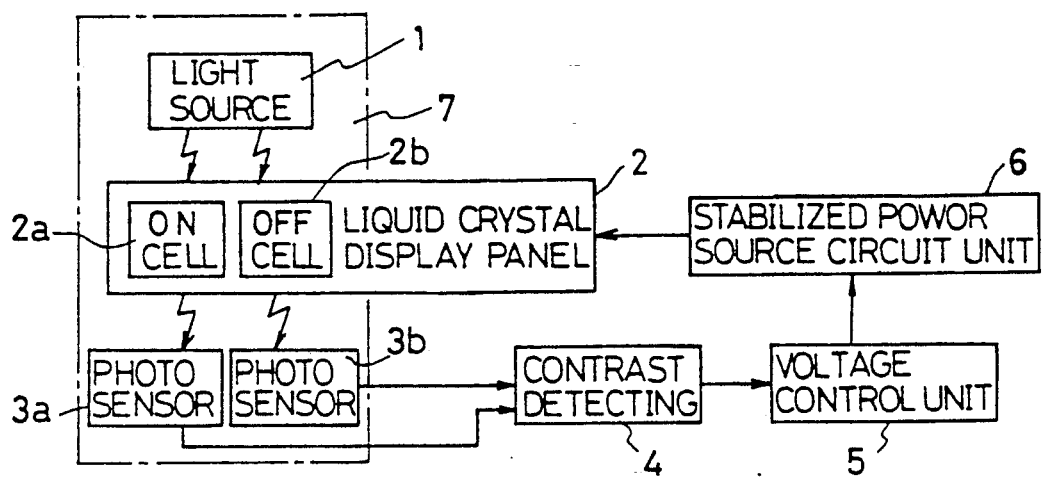
FIG. 2A
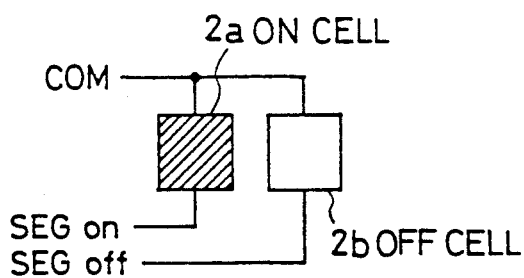
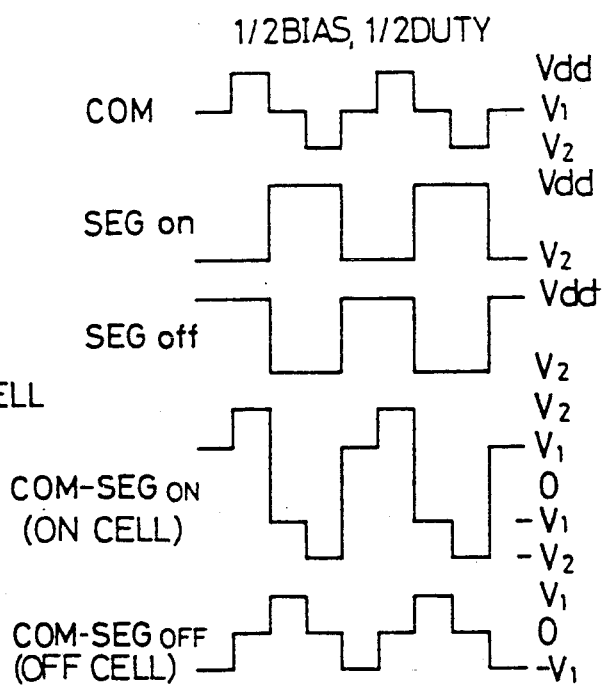
FIG. 2B 5,153,756

LIQUID CRYSTAL DISPLAY DEVICE WITH AUTOMATIC CONSTRAST CONTROL

BACKGROUND OF THE INVENTION

The present invention relates to automatic contrast control of a liquid crystal display device for use in a personal computer etc.

Conventionally, contrast adjustment of the liquid crystal display is effected manually by increasing on decreasing a drive voltage applied to a liquid crystal. For example, in contrast adjustment of a liquid crystal display device used in a personal computer, on adjusting volume resistor or variable resister is manipulated by an operator to obtain an optimum contrast of the display in a well known manner.

However, in the conventional manual adjustment method, the adjusting volume resistor must be exposed on an outerior of the display device, thereby causing difficulty, particularly, mechanical and exterior design of a portable display device such as a handy display terminal. Further, some type of the display device is not provided with the adjusting function, and, instead, it uses highly precise components so as to improve accuracy of drive voltage applied to the liquid crystal, thereby causing increase in production cost and degradation in reliability.

SUMMARY OF THE INVENTION

In order to solve the above noted problems, an object of the present invention is to provide a liquid crystal display device having an automatic contrast control function. The device is comprised of a liquid crystal display unit having a liquid crystal monitor cell for use in detection of display contrast, a photo-sensing unit for detecting an intensity of incident light transmitted as the monitor cell and for converting the detected intensity into a corresponding signal, a contrast detecting unit receptive of the corresponding signal for producing an electric signal representative of the display contrast of the liquid crystal display unit, a voltage control unit receptive of the electric signal for producing a control signal or output signal effective to control a drive voltage applied to the liquid crystal display unit, and a stabilized power supply unit receptive of the control signal for stabilizing the drive voltage and for supplying the stabilized drive voltage to the liquid crystal display unit.

BRIEF DESCRIPTION OF THE DRAWINGS

FIG. 1 is a basic circuit block diagram of the inventive display device;

FIG. 2A is a schematic diagram showing a pair of liquid crystal monitor cells for detecting display contrast;

FIG. 2B is a diagram showing an example of dynamic drive voltage waveforms;

DETAILED DESCRIPTION OF INVENTION

Figure 3:
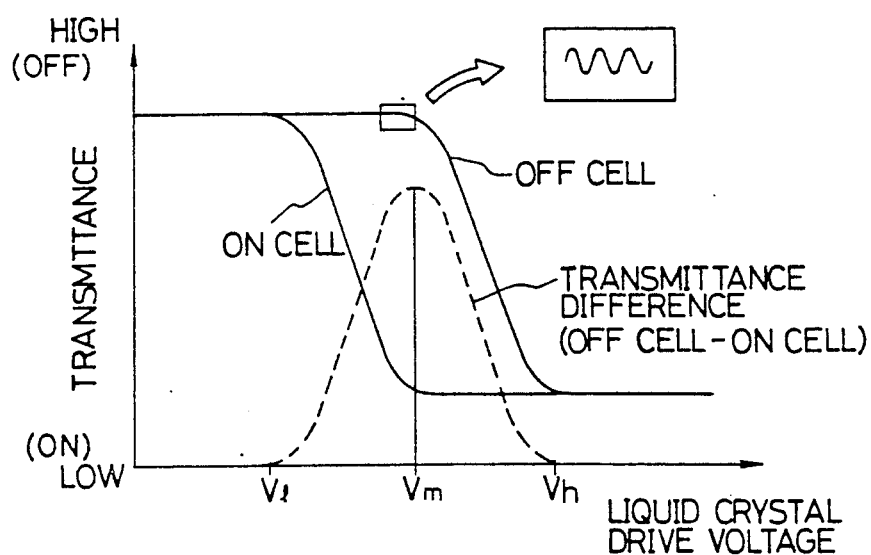
FIG. 3 is a graph showing the relation between the liquid crystal drive voltage and the light transmittance.

Hereinafter, one embodiment of the present invention will be described in conjunction with the drawings. FIG. 1 is a basic circuit block diagram showing a basic circuit structure according to the invention. In a block 7 for detecting an intensity of transmitting light, there is provided a light source 1 which emits an incident light. A pair of liquid crystal monitor cells 2a and 2b are provided in or around a liquid crystal display panel 2 for receiving the incident light. The one monitor cell 2a is held in an ON state or nontransmissive state and the other monitor cell 2b is held in an OFF state or transmissive state. A pair of photosensors 3a and 3b are disposed behind the corresponding monitor cells 2a and 2b to receive the transmitted light. The photosensors 3a and 3b respectively feed voltage or current signals representative of the intensities of the received light to a contrast detecting unit 4. The contrast detecting unit 4 detects a difference between the inputted voltage or current signals from the pair of photosensors 3a and 3b, and it produces a converted electric signal according to the detected difference to a voltage control unit 5. The voltage control unit 5 operates according to the inputted electric signal so as to control an output voltage of a stabilized power supply unit 6. The control unit 5 is provided with the function to detect a peak value of the electric signal. The stabilized power supply unit 6 is constructed to supply a drive voltage to be applied to the liquid crystal display panel 2.

In such a constructed circuit, the difference in the transmitted light intensities is detected between the liquid crystal monitor cell 2a in the ON state and the other liquid crystal monitor cell 2b in the OFF state. The control unit 5 operates to control the drive voltage applied to the liquid crystal display panel so as to substantially maximize the intensity difference to thereby automatically set an optimum contrast of the display.

The liquid crystal display panel must be driven by an AC drive voltage due to its nature. There have been proposed various driving methods. For example, the liquid crystal display panel may be dynamically driven in a ⅓ bias and ½ duty mode. FIG. 2A shows an arrangement of the liquid crystal monitor cells dynamically driven for detecting the display contrast, and FIG. 2B shows waveforms of driving voltage applied to the liquid crystal display panel. In the figures, COM denotes a common drive line of the liquid crystal monitor cells 2a and 2b, SEG on denotes a segment drive line connected to the ON cell 2a held in the ON state, and SEG off denotes another segment drive line connected to the OFF cell 2b held in the OFF state. Vdd, V1 and V2 denote different drive voltage levels, and they have a relation $V2 + (Vdd - V2)/2 = V1$.

FIG. 3 shows the relation between the liquid crystal drive voltage and the light transmittance, measured when the liquid crystal monitor cells are driven by the particular method shown in FIG. 2B so as to detect or monitor the display contrast. When gradually raising the liquid crystal drive voltage from a significantly low level, the light transmittance difference is developed between the OFF cell and the ON cell at the voltage level V1, and reaches the maximum value at the voltage level Vm, and then diminishes at the voltage level Vh. The light transmittance difference indicates the display contrast. Therefore, the liquid crystal drive voltage is set to substantially the optimum voltage level Vm so as to obtain the generally good contrast. Namely, the circuit constructed as shown in FIG. 1 can operate to automatically set the optimum display contrast of the liquid crystal display panel.

The actual light transmittance curve of the liquid crystal display panel includes an AC component; however, the FIG. 3 graph simply shows a mean value curve in order to facilitate the understanding of the description.

Figure 4:
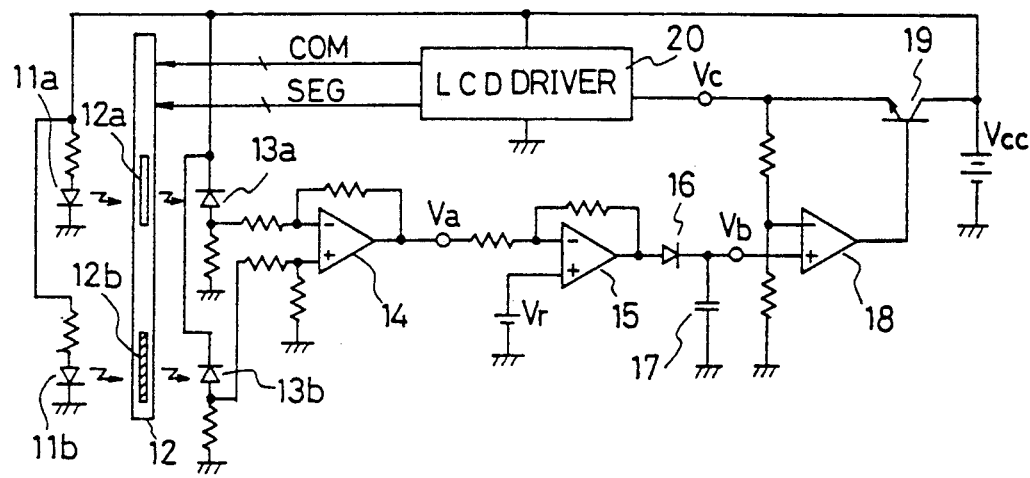
FIG. 4 is a circuit diagram showing an embodiment of the inventive display device.
Figure 5:
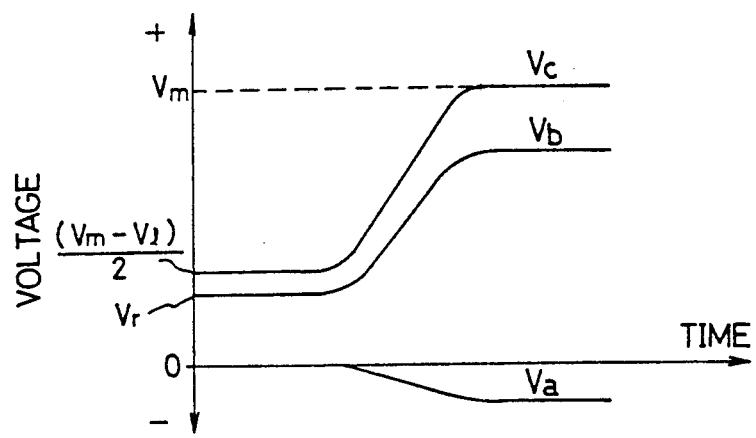
FIG. 5 is a diagram showing voltage levels developed in the various parts of the FIG. 4 circuit.

Next, a description is given for the detailed circuit structure of the inventive display device in conjunction with FIG. 4 which shows a circuit structure and with FIG. 5 which shows a voltage variation at various parts in terms of time. Referring to FIGS. 4 and 5, a liquid crystal display panel 12 is driven by a liquid crystal driver 20. Its drive voltage Vc is supplied from a stabilized power supply unit comprised of a non-inverting amplifier 18 and a transistor 19. The liquid crystal display panel 12 contains therein a pair of OFF cell 12a and ON cell 12b for detecting display contrast.

In operation, a pair of light-emitting diodes 11a and 11b emit incident light which passes through the corresponding OFF cell 12a and ON cell 12b, and which is then received by corresponding photodiodes 13a and 13b. Resistors connected in series to the respective photodiodes 13a and 13b convert the photocurrents into corresponding voltage signals, which are inputted into a differential amplifier 14.

The differential amplifier 14 produces an output voltage Va which indicates the intensity difference of the transmitted light between the OFF cell 12a and the ON cell 12b, i.e., the display contrast. The output voltage Va is amplified by a certain factor and then is added with an offset voltage Vr. This offset voltage Vr is needed for the following reason. Referring back to FIG. 3 which shows the relation between the liquid crystal drive voltage and the light transmittance, the effective display contrast can be observed in a limited drive voltage range from V1 to Vh. Therefore, if the offset voltage Vr were eliminated from the FIG. 4 circuit structure, the circuit would not be operative in the state where no contrast develops. Therefore, it is needed to add provisionally the appropriate offset voltage Vr. The suitable or optimum value of Vr can be set by driving $(Vm-V1)/2$ by an amplification factor of the succeeding non-inverting amplifier 18.

Returning to FIGS. 4 and 5, the output voltage of the inverting amplifier 15 is fed to a peak-hold circuit composed of a diode 16 and a capacitor 17 so as to hold the maximum value of the varying output voltage. The thus held maximum voltage value is applied to a non-inverting terminal of the non-inverting amplifier 18 in the form of a voltage signal Vb. As described before, the non-inverting amplifier 18 constitutes the stabilized power source circuit together with the transistor 19 so as to supply a voltage signal Vc which is obtained by amplifying the voltage signal Vb with a desired amplification factor to the liquid crystal driver 20. The voltage signal Vc corresponds to the liquid crystal drive voltage indicated in FIG. 3. This drive voltage gradually increases from a level of $(Vm-V1)/2$, and is then held at $Vc=Vm$ where the contrast becomes maximum.

FIG. 1 and FIG. 4 show only an example of the basic circuit structure to realize the invention, and are not intended to limit the technical scope of the invention. The present invention may be realized by other ways. For example, a single liquid monitor cell may be used for detecting the display contrast. Namely, the signal monitor cell may be driven in a time-sharing mode to detect the light transmittance intensity in the OFF state and ON state. Further, the incorporated light source can be removed and instead an external light can be utilized as incident light. Moreover, the light-emitting diodes 11a and 11b and the photodiodes 13a and 13b may be arranged relative to the liquid crystal display panel 12 at a particular angle identical to the optimum viewing angle thereof in the FIG. 4 structure in order to obtain the optimum contrast at the practical viewing angle.

As described above, according to the invention, the liquid crystal display panel is provided with a liquid crystal monitor cell for detecting the display contrast. The detected results indicative of the light transmission intensity of the display panel is fed back to regulate the drive voltage applied to the liquid crystal display panel to thereby effectively automatically control the display contrast to the optimum level.

What is claimed is:

1. A liquid crystal display apparatus comprising:
   a liquid crystal display unit having liquid crystal cell means for use in detection of display contrast, the liquid crystal cell means comprising a pair of liquid crystal cells, one held in an OFF state and the other held in an ON state, so as to monitor the display contrast;
   a photosensor unit for sensing an intensity of light transmitted through the liquid crystal cell means and for converting the sensed intensity into a corresponding signal;
   a contrast detecting unit receptive of the corresponding signal for producing an electric signal indicative of the display contrast
   a voltage control unit receptive of the electric signal for producing an output signal effective to control a drive voltage applied to the liquid crystal display unit, the voltage control unit including a peak-hold circuit for holding a peak of the electric signal to produce the output signal effective to control the drive voltage; and
   a stabilized power supply unit receptive of the output signal from the voltage control unit for supplying a stabilized drive voltage to the liquid crystal display unit so as to automatically control the display contrast of the liquid crystal display unit.

* * * * *